US012024362B2

(12) United States Patent
Hardman

(10) Patent No.: US 12,024,362 B2
(45) Date of Patent: Jul. 2, 2024

(54) GARBAGE RECEPTACLE ASSEMBLY

(71) Applicant: Max Hardman, Allison Park, PA (US)

(72) Inventor: Max Hardman, Allison Park, PA (US)

( * ) Notice: Subject to any disclaimer, the term of this patent is extended or adjusted under 35 U.S.C. 154(b) by 353 days.

(21) Appl. No.: 17/666,024

(22) Filed: Feb. 7, 2022

(65) Prior Publication Data

US 2023/0249906 A1 Aug. 10, 2023

(51) Int. Cl.
*B65F 1/00* (2006.01)
*B65F 1/02* (2006.01)
*B65F 1/14* (2006.01)
*B65F 1/16* (2006.01)

(52) U.S. Cl.
CPC .............. *B65F 1/1615* (2013.01); *B65F 1/02* (2013.01); *B65F 1/1473* (2013.01); *B65F 1/1646* (2013.01); *B65F 2210/181* (2013.01)

(58) Field of Classification Search
CPC ........ B65F 1/02; B65F 1/1615; B65F 1/1473; B65F 1/1649; B65F 2210/181
USPC ..................................................... 280/47.371
See application file for complete search history.

(56) References Cited

U.S. PATENT DOCUMENTS 3,866,936 A 2/1975 Hedges
3,904,218 A 9/1975 Kostic
4,199,161 A 4/1980 Nieminen
5,251,780 A * 10/1993 Lee ....................... B65F 1/1468 D34/5
5,730,451 A * 3/1998 Walker .................. B65F 1/1468 220/908
5,802,693 A * 9/1998 Lee ......................... B65F 1/004 29/434
6,053,354 A * 4/2000 Niemeyer ................. B65F 1/16 220/826
6,651,992 B1 * 11/2003 Smith, Sr. ............... B62B 1/125 16/113.1
8,201,704 B2 * 6/2012 Finnestad ............... B65F 1/163 220/23.91
8,348,080 B2 * 1/2013 Baptiste ................ B65F 1/1468 220/908
8,360,445 B2 * 1/2013 Meers ....................... B65F 1/16 220/318
8,881,930 B2 * 11/2014 Banik ....................... B65F 1/02 220/326
9,828,177 B2 * 11/2017 Nussbaum .......... E05B 15/0093
10,766,695 B2 * 9/2020 Marcrander .............. B65F 1/14
11,747,783 B2 * 9/2023 Gordon .............. G05B 19/0426 700/275
2007/0209846 A1 9/2007 Wilson
2008/0038102 A1 2/2008 Murphy
2010/0096389 A1 4/2010 Volpe
2016/0368709 A1 * 12/2016 Kostopoulos ............. B65F 1/16

* cited by examiner

*Primary Examiner* — Hau V Phan

(57) ABSTRACT

A garbage receptacle assembly includes a garbage can has a lid is hingedly disposed on the garbage can for opening and closing the garbage can. A pair of rear wheels is each of the rear wheels is rotatably integrated into the garbage can and a wheel lock is movably integrated into the garbage can for selectively inhibiting each of the rear wheels from rotating. A rear handle is coupled to and angles upwardly from the garbage can and the rear handle has an adjustable length. A front handle is coupled to the garbage can for gripping. A roller is pivotally coupled to the garbage can for steering the garbage can along the support surface.

12 Claims, 7 Drawing Sheets

GARBAGE RECEPTACLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to garbage device and more particularly pertains to a new garbage device for inhibiting animals from accessing garbage contained in a garbage can. The device includes a garbage can with a pair of rear wheels and a front roller that is pivotable for steering the garbage can. Additionally, the device includes a wheel lock for locking the rear wheels thereby inhibiting the garbage can from rolling. The device includes a pair of air valves to facilitate air to pass through the garbage can when a garbage bag is either placed into the garbage can or removed from the garbage can.

Description of Related Art Including Information Disclosed Under 37 CFR 1.97 and 1.98

The prior art relates to garbage devices including a trash cart with a side opening door and wheels. The prior art discloses a plurality of wedge shaped trash receptacles which are each positionable on a rolling platform. The prior art discloses a variety of rolling trash carts that each includes a lid and a plurality of wheels. The prior art discloses a variety of remotely controlled, motorized garbage cans.

BRIEF SUMMARY OF THE INVENTION

An embodiment of the disclosure meets the needs presented above by generally comprising a garbage can has a lid is hingedly disposed on the garbage can for opening and closing the garbage can. A pair of rear wheels is each of the rear wheels is rotatably integrated into the garbage can and a wheel lock is movably integrated into the garbage can for selectively inhibiting each of the rear wheels from rotating. A rear handle is coupled to and angles upwardly from the garbage can and the rear handle has an adjustable length. A front handle is coupled to the garbage can for gripping. A roller is pivotally coupled to the garbage can for steering the garbage can along the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
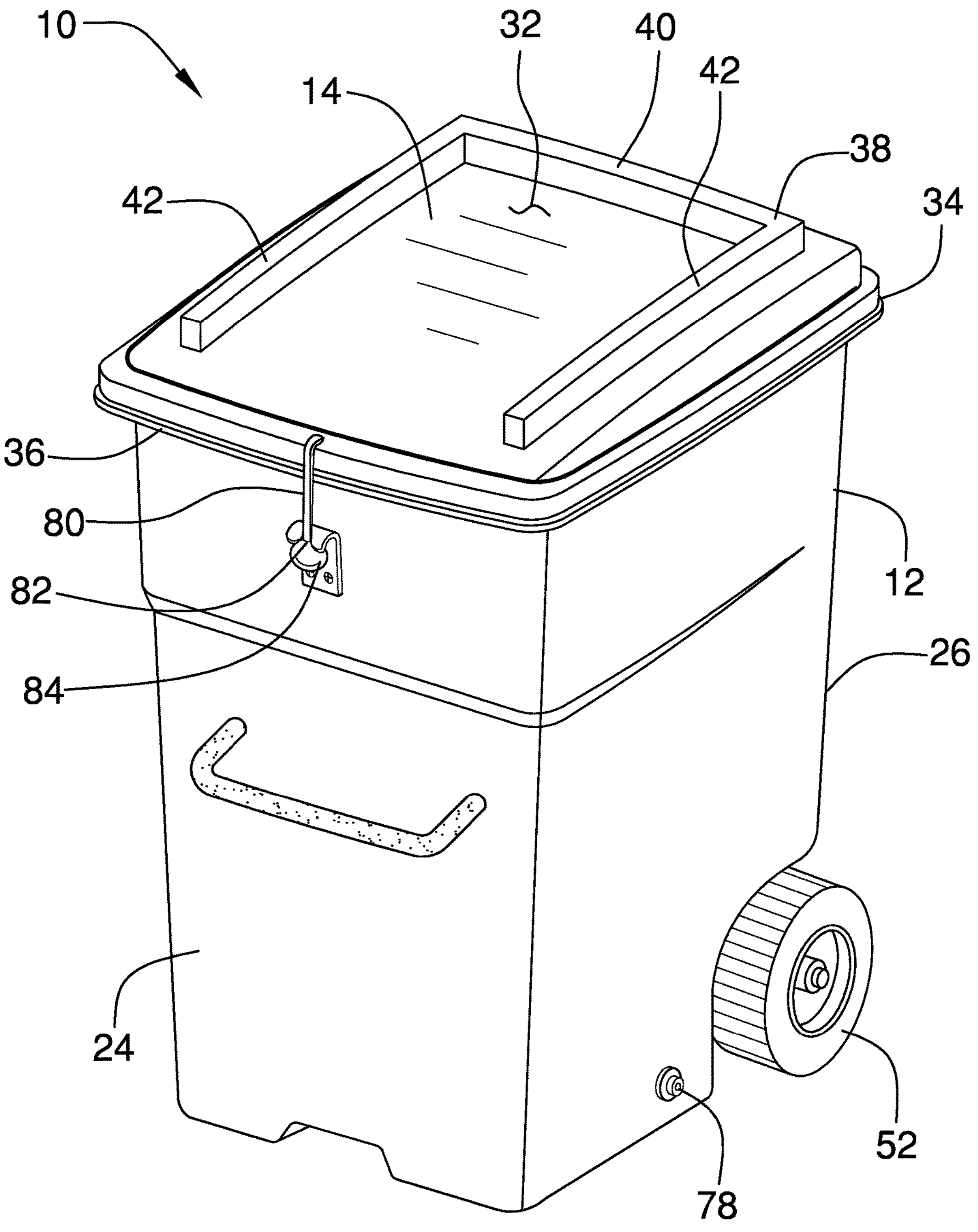
FIG. 1 is a front perspective view of a garbage receptacle assembly according to an embodiment of the disclosure.
Figure 2:
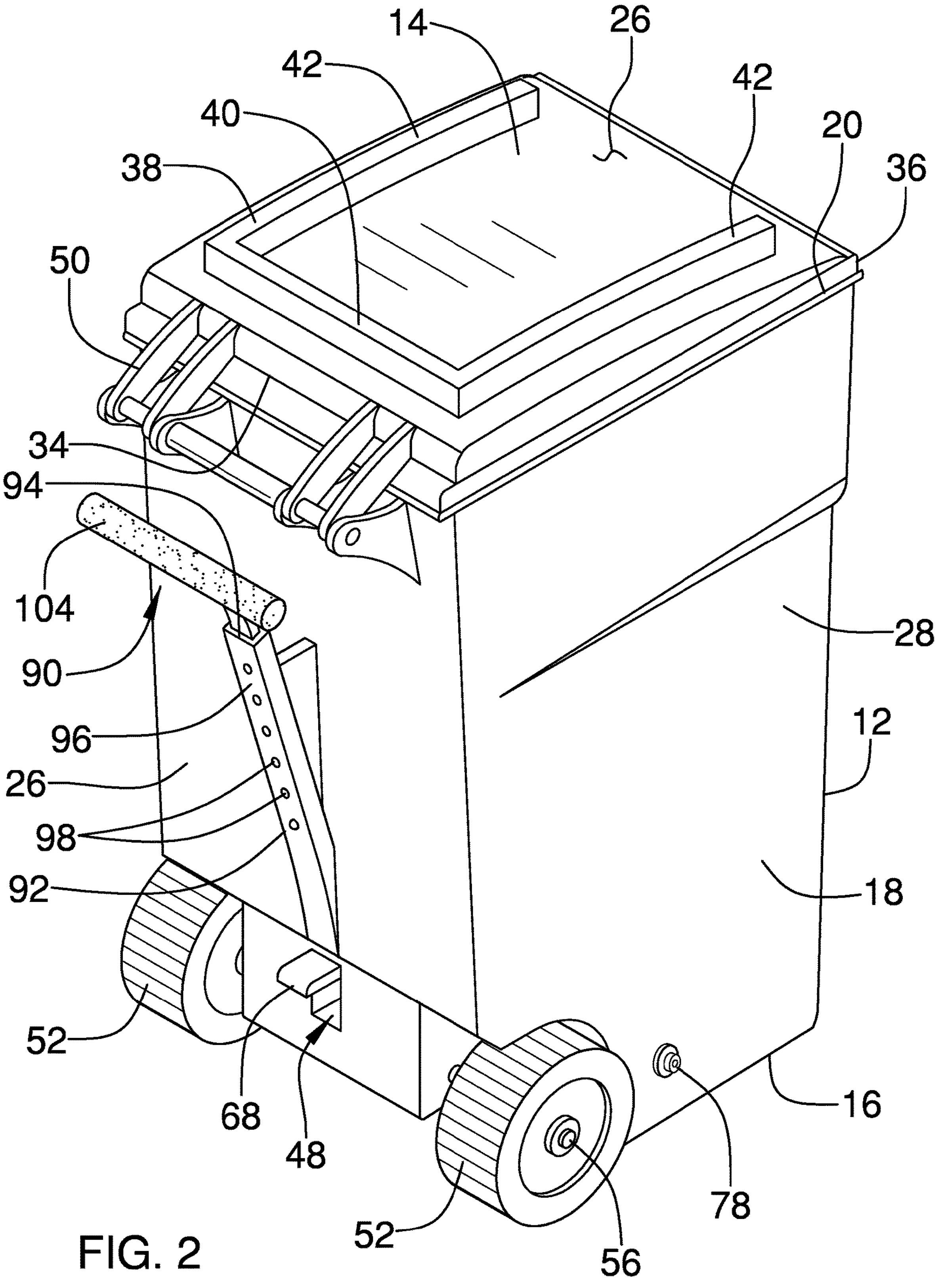
FIG. 2 is a back perspective view of an embodiment of the disclosure.
Figure 3:
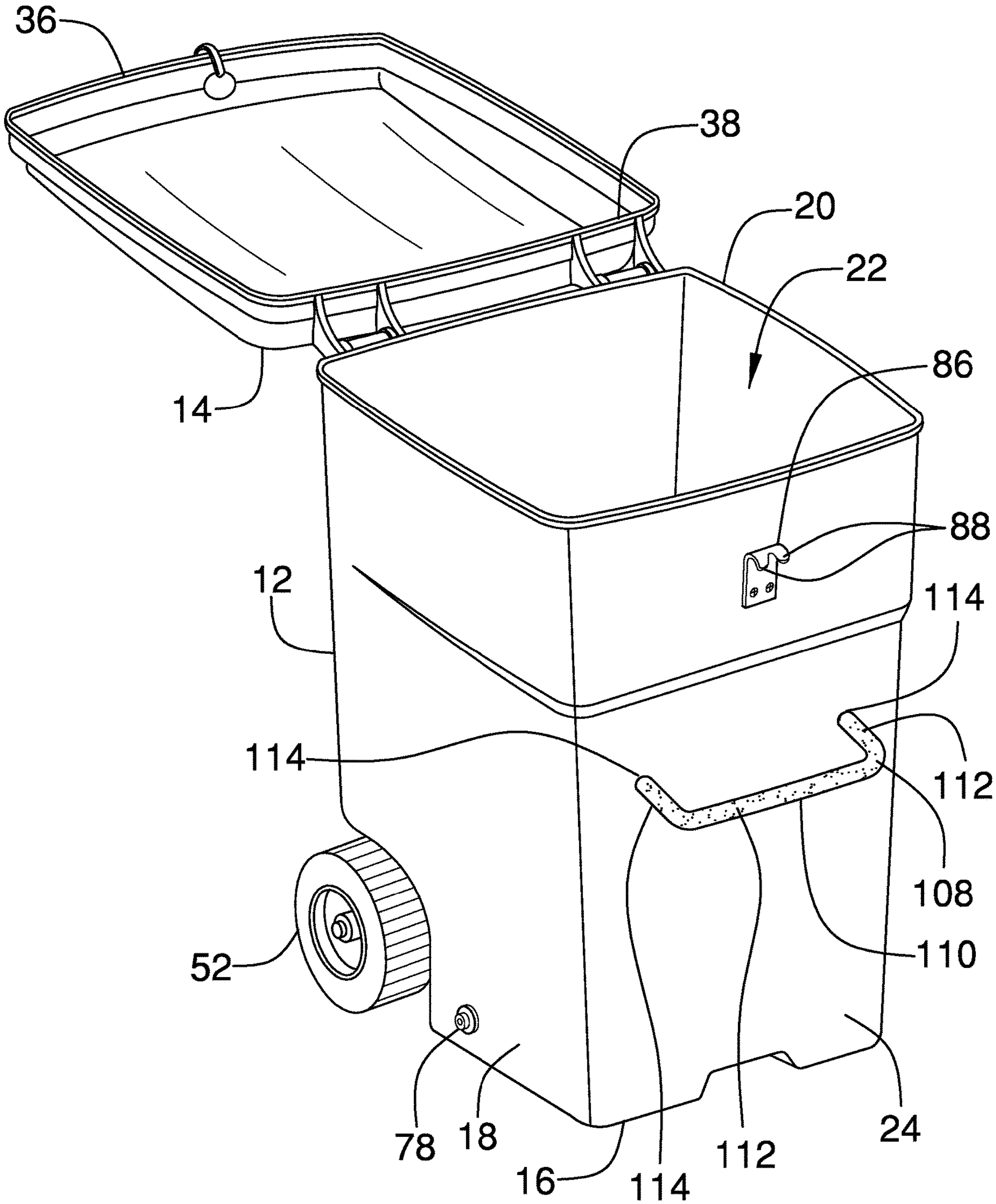
FIG. 3 is a perspective view of an embodiment of the disclosure showing a lid in an open position.
Figure 4:
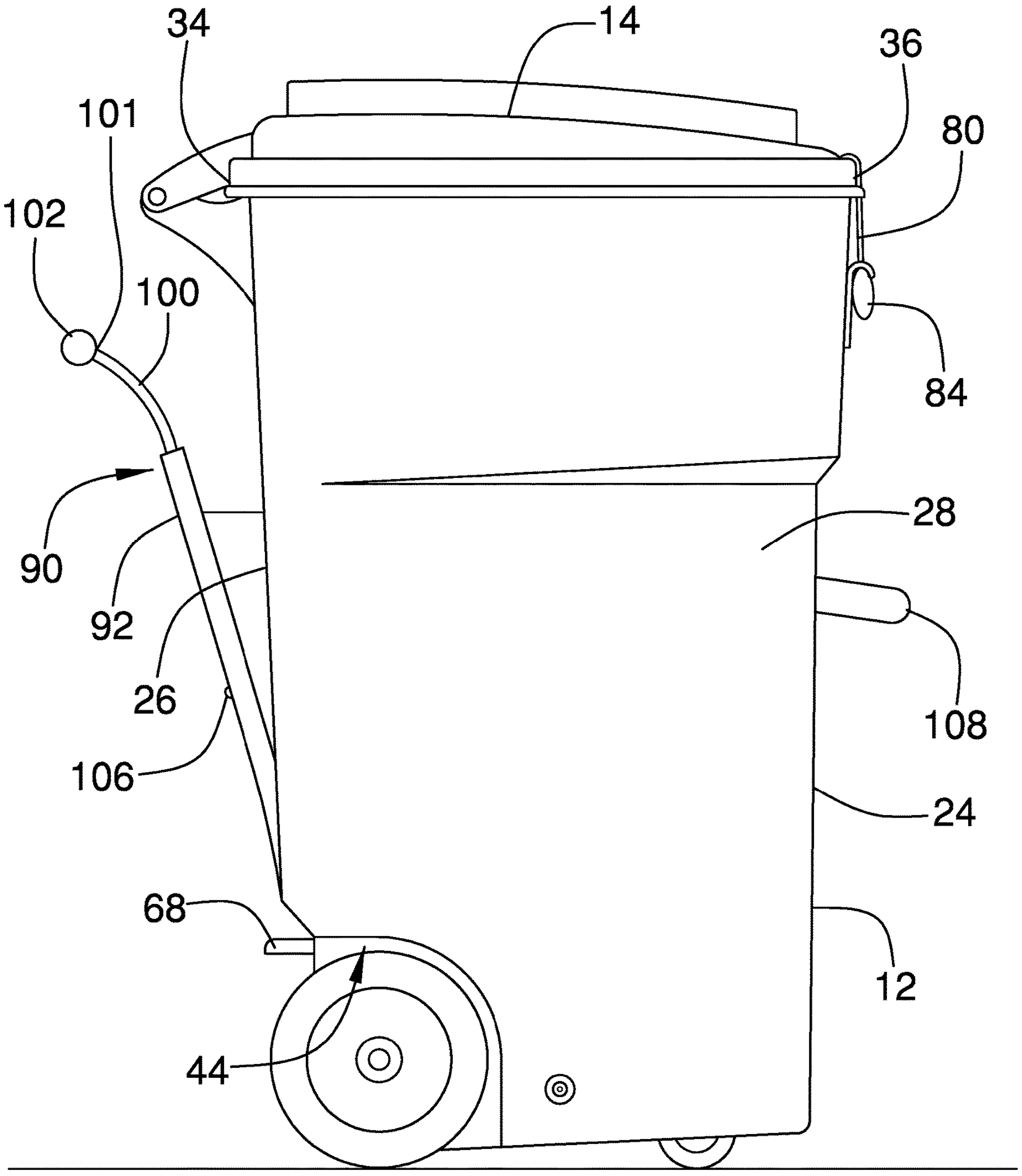
FIG. 4 is a right side view of an embodiment of the disclosure.
Figure 5:
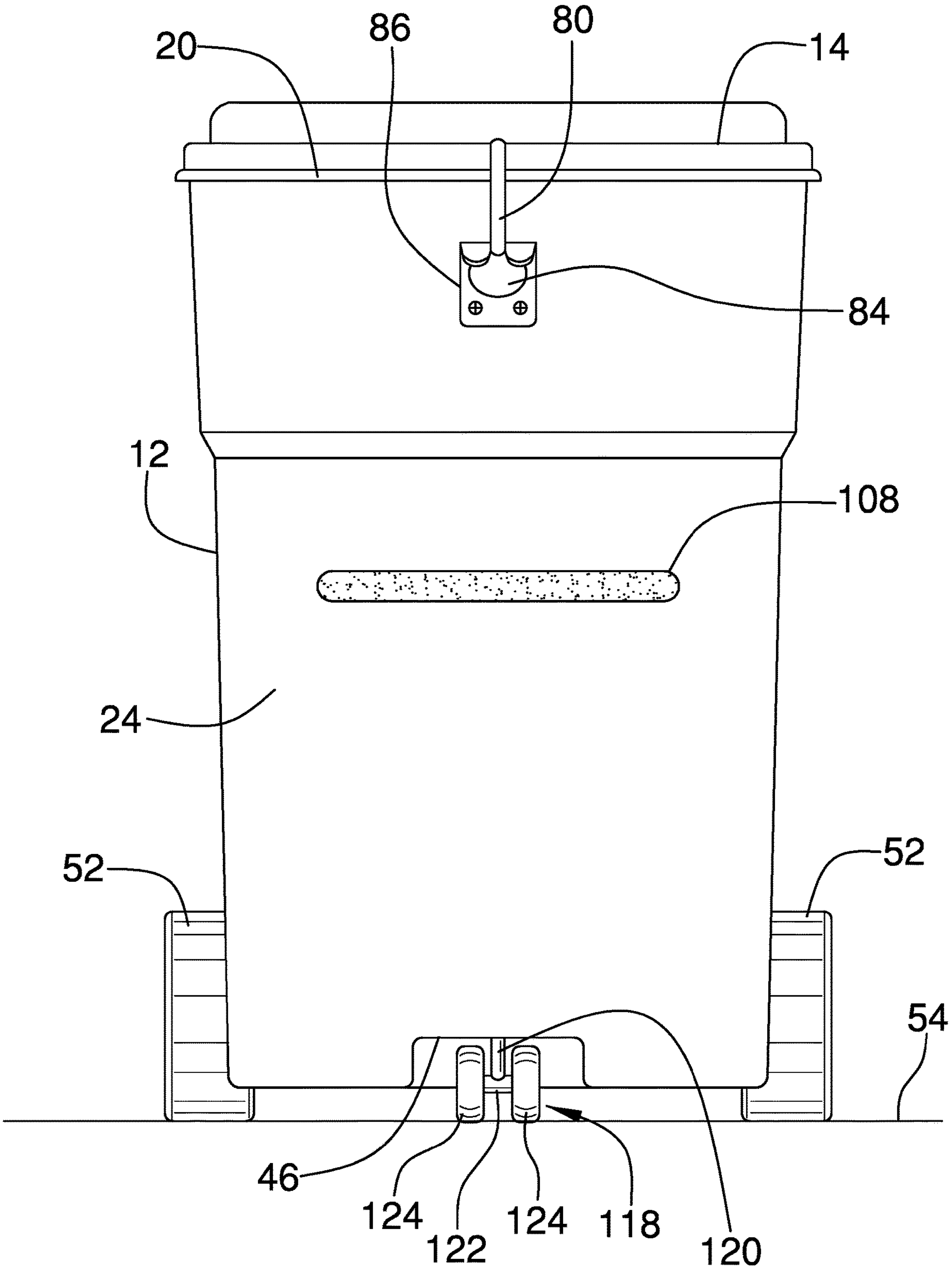
FIG. 5 is a front view of an embodiment of the disclosure.
Figure 6:
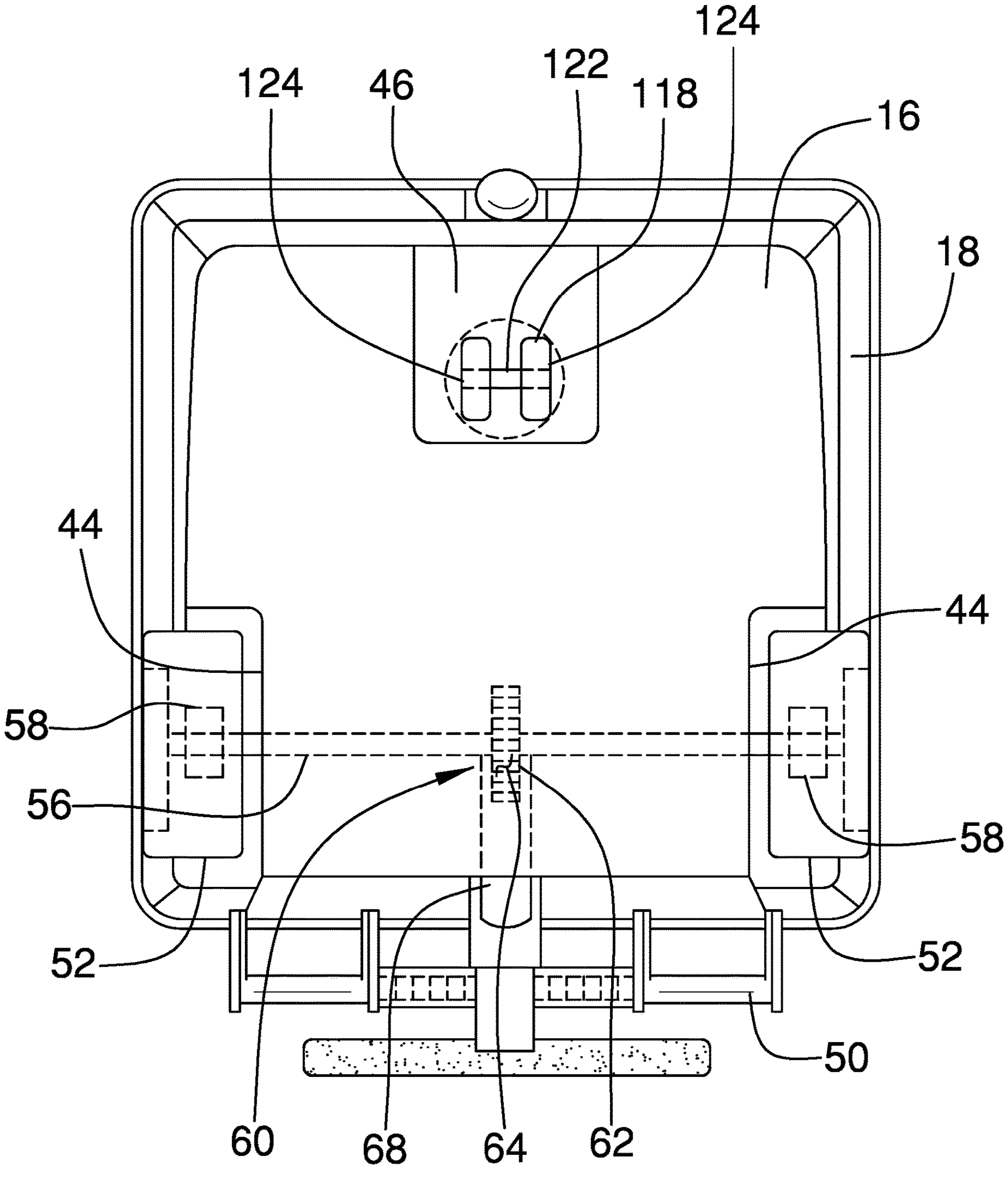
FIG. 6 is a bottom phantom view of an embodiment of the disclosure.
Figure 7:
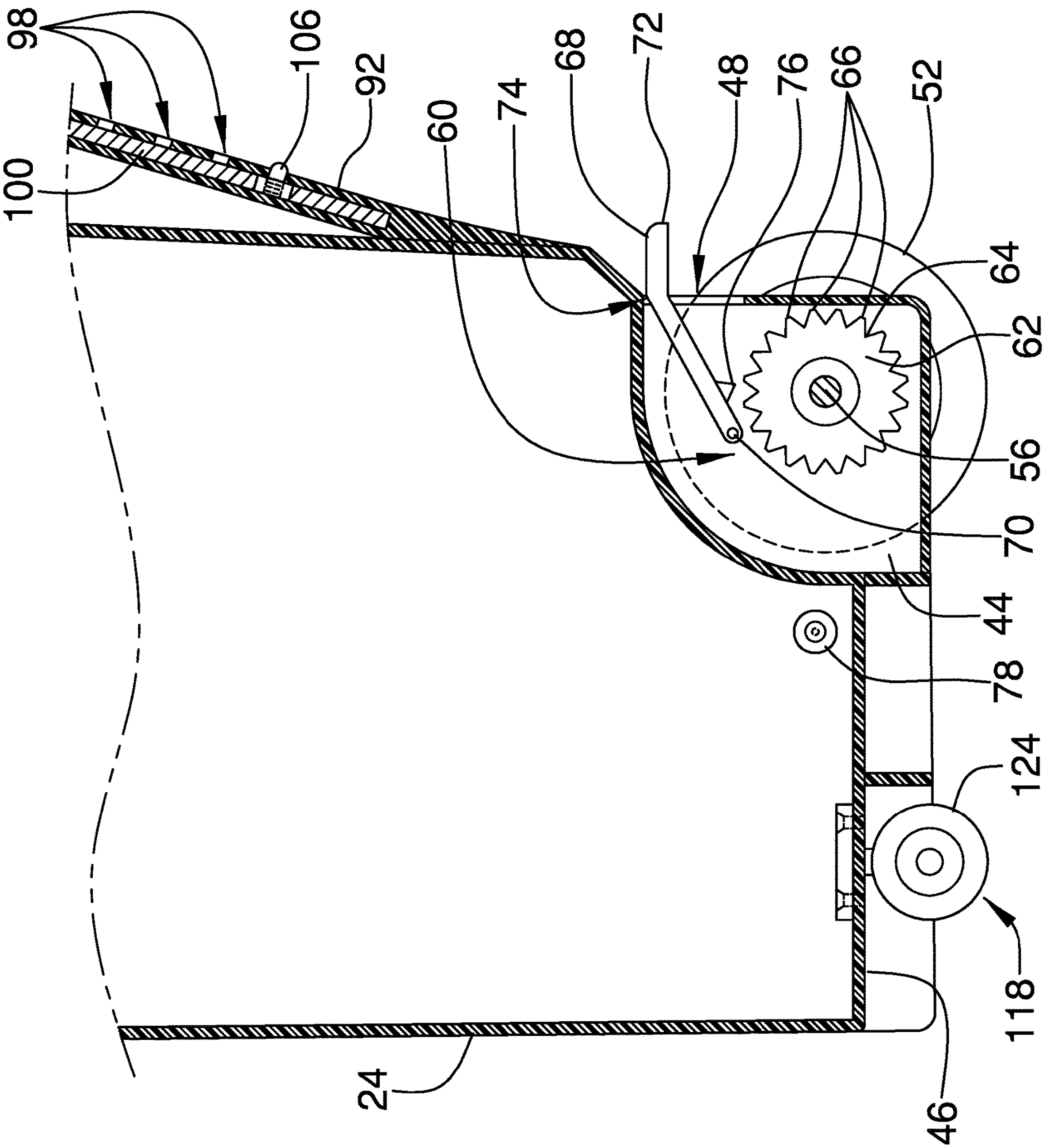
FIG. 7 is a left side cut-away view of an embodiment of the disclosure.

With reference now to the drawings, and in particular to FIGS. 1 through 7 thereof, a new garbage device embodying the principles and concepts of an embodiment of the disclosure and generally designated by the reference numeral 10 will be described.

As best illustrated in FIGS. 1 through 7, the garbage receptacle assembly 10 generally comprises a garbage can 12 that has a lid 14 which is hingedly disposed on the garbage can 12 for opening and closing the garbage can 12. The garbage can 12 has a bottom wall 16 and an outer wall 18 extending upwardly from the bottom wall 16, and the outer wall 18 has a distal edge 20 with respect to the bottom wall 16 defining an opening 22 in the garbage can 12. The outer wall 18 has a front side 24, a back side 26, a first lateral side 28 and a second lateral side 30. The lid 14 has a top surface 32, a rear edge 34 and a front edge 36, and the rear edge 34 is hingedly coupled to the distal edge 20 of the outer wall 18 such that the lid 14 rests on the distal edge 20 when the lid 14 is closed.

The top surface 32 has a prominence 38 extending upwardly from the top surface 32 and the prominence 38 has a central portion 40 extending between a pair of outward portions 42. The outward portions 42 are spaced apart from each other and are perpendicularly oriented with the central portion 40 such that the prominence 38 has a U-shape. In this way the prominence 38 can inhibit objects placed on the lid

14 from sliding off of the lid 14. The central portion 40 is oriented parallel to the rear edge 34 of the lid 14 having each of the outward portions 42 extending toward the front edge 36 of the lid 14.

The outer wall 18 has a pair of wheel wells 44 that is each recessed into the outer wall 18, and each of the wheel wells 44 is positioned on a respective one of the first lateral side 28 and the second lateral side 30. Additionally, each of the wheel wells 44 is aligned with an intersection with the back side 26 of the outer wall 18. The bottom wall 16 has a recess 46 extending upwardly toward the distal edge 20 of the outer wall 18. The recess 46 is aligned with the front side 24 of the outer wall 18 and the recess 46 is centrally positioned along the front side 24. The back side 26 of the outer wall 18 has a foot pedal well 48 extending toward the front side 24 of the outer wall 18. The foot pedal well 48 is positioned adjacent to the bottom wall 16, and the foot pedal well 48 is centrally positioned on the back side 26.

The lid 14 includes a hinge 50 that is coupled between the outer wall 18 and the lid 14. The hinge 50 rotates in a first direction when the lid 14 is opened. Conversely, the hinge 50 rotates in a second direction when the lid 14 is closed. The hinge 50 resists rotating in the second direction thereby inhibiting the lid 14 from slamming into the closed position. The hinge 50 may be a soft close hinge of any conventional design. A pair of rear wheels 52 is each rotatably integrated into the garbage can 12 to roll along a support surface 54 for transporting the garbage can 12. Each of the rear wheels 52 is positioned in a respective one of the wheel wells 44 in the outer wall 18 of the garbage can 12. Additionally, each of the rear wheels 52 has a width that is sufficient to facilitate each of the rear wheels 52 to extend outwardly beyond the respective first lateral side 28 and second lateral side 30 of the outer wall 18 of the garbage can 12. In this way the rear wheels 52 enhance stability of the garbage can 12 and inhibit the garbage can 12 from tipping sideways when the garbage can 12 is being rolled along the support surface 54.

An axle 56 extends between each of the rear wheels 52 and a pair of bearings 58 is each disposed on the axle 56. Each of the bearings 58 engages a respective one of the rear wheels 52 for enhancing rotation of the rear wheels 52 on the axle 56. In this way each of the bearings 58 helps to ease rolling the garbage can 12 along the support surface 54. Each of the bearings 58 may comprise a ball bearing or other type of friction reducing bearing that would commonly be found on wheel axles. Furthermore, each of the rear wheels 52 may comprise rubber wheels or the like thereby enhancing traction of the rear wheels 52 and reducing noise produced by the rear wheels 52 for quiet transportation in a highly populated neighborhood.

A wheel lock 60 is provided and the wheel lock 60 is movably integrated into the garbage can 12. The wheel lock 60 is urgeable into a locking position thereby inhibiting each of the rear wheels 52 from rotating. Conversely, the wheel lock 60 is biased into an unlock 106 position thereby facilitating the rear wheels 52 to rotate. The wheel lock 60 comprises a gear 62 that is fixed around the axle 56 such that the gear 62 rotates when the axle 56 rotates. The gear 62 has an outer surface 64 and a plurality of teeth 66 is integrated into the outer surface 64.

The wheel lock 60 includes a foot pedal 68 that has a first end 70 and a second end 72. The foot pedal 68 extends into the foot pedal well 48 in the back side 26 of the outer wall 18 of the garbage can 12 having the first end 70 being positioned adjacent to the gear 62. The first end 70 is pivotally coupled to the garbage can 12 and the second end 72 is positioned outside of the outer wall 18 thereby facilitating the second end 72 to be stepped upon. The foot pedal 68 has a bend 74 positioned between the first end 70 and the second end 72, and the foot pedal 68 has a tooth 76 extending downwardly from the foot pedal 68. The tooth 76 is positioned adjacent to the first end 70 and the tooth 76 engages respective ones of the teeth 66 on the outer surface 64 of the gear 62 when the foot pedal 68 is stepped upon thereby inhibiting the rear wheels 52 from rotating. Conversely, the foot pedal 68 is biased into a releasing positioned having the tooth 76 being displaced from the outer surface 64 of the gear 62 thereby facilitating the rear wheels 52 to freely rotate.

A pair of air valves 78 is provided and each of the air valves 78 is integrated into the garbage can 12. Each of the air valves 78 passes air either into or out of the garbage can 12 when a garage bag is inserted into the garbage can 12 or removed from the garbage can 12. In this way the air valves 78 inhibit negative air pressure or positive air pressure from building in the garbage can 12 when the garbage bag is inserted into or removed from the garbage can 12. Each of the air valves 78 extends through a respective one of the first lateral side 28 or the second lateral side 30 of the outer wall 18 of the garbage can 12, and each of the air valves 78 is positioned adjacent to the bottom wall 16 of the garbage can 12.

A securing member 80 is coupled to the lid 14 and the securing member 80 is comprised of a resiliently stretchable material thereby facilitating the securing member 80 to be stretched. The securing member 80 is coupled to and extends downwardly from the front edge 36 of the lid 14. The securing member 80 has a distal end 82 with respect to the front edge 36 and a ball 84 is attached to the distal end 82. An engagement 86 is coupled to the garbage can 12 and the securing member 80 releasably engages the engagement 86 for locking the lid 14 in a closed position. In this way the securing member 80 inhibits animals from opening the lid 14 and accessing garbage contained in the garbage can 12.

The engagement 86 is positioned on the front side 24 of the outer wall 18 of the garbage can 12, and the engagement 86 includes a pair of fingers 88 each extending away from the front wall. The fingers 88 are spaced apart from each other thereby facilitating the securing member 80 to be extended between the fingers 88. Additionally, each of the fingers 88 curves downwardly toward the bottom wall 16 of the garbage can 12. In this way the fingers 88 conform to the curvature of the ball 84 on the securing member 80 when the securing member 80 is extended between the fingers 88 for locking the lid 14 in the closed position.

A rear handle 90 is coupled to and angles upwardly from the garbage can 12 such that the rear handle 90 can be gripped for transporting the garbage can 12. Additionally, the rear handle 90 has an adjustable length to accommodate a user's preference. The rear handle 90 comprises a sleeve 92 that is integrated into the back side 26 of the outer wall 18 of the garbage can 12. The sleeve 92 extends upwardly toward the distal edge 20 of the outer wall 18 and angles away from the back side 26. The sleeve 92 has a distal end 94 with respect to the back side 26 and an outside wall 96. The outside wall 96 has a plurality of lock holes 98 each extending into an interior of the sleeve 92, and the lock holes 98 are spaced apart from each other and are distributed along a full length of the sleeve 92.

The rear handle 90 includes a member 100 which extends into the distal end 94 of the sleeve 92 such that the member 100 is slidably disposed in the sleeve 92. The member 100 has an exposed end 101 with respect to the sleeve 92 and the member 100 curves rearwardly from the back side 26 of the outer wall 18 of the garbage can 12. The rear handle 90 includes a rod 102 that is coupled to the exposed end 101 having the rod 102 being perpendicularly oriented with the member 100. In this way the rod 102 can be gripped. A cushion 104 may surround the rod 102 and the cushion 104 may be comprised of a resiliently compressible material for enhancing gripping the rod 102.

The rear handle 90 includes a lock 106 that is movably integrated into the member 100. The lock 106 is biased outwardly form the member 100 and the lock 106 is urgeable into the member 100. The lock 106 extends outwardly through a respective one of the lock holes 98 in the sleeve 92 for retaining the member 100 at a selected length with respect to the sleeve 92. The lock 106 may comprise a spring loaded ball that is integrated into the member 100.

A front handle 108 is coupled to the garbage can 12 thereby facilitating the front handle 108 to be gripped. The front handle 108 has a middle portion 110 extending between a pair of lateral portions 112. The lateral portions 112 are spaced apart from each other and are perpendicularly oriented with the middle portion 110 such that the front handle 108 has a U-shape. Each of the lateral portions 112 has a distal end 114 with respect to the middle portion 110, and the distal end 114 of each of the lateral portions 112 is coupled to the front side 24 of the outer wall 18 of the garbage can 12. A cushion 116 may surround the front handle 108 and the cushion 116 on the front handle 108 may be comprised of a resiliently compressible material for enhancing comfort for gripping the front handle 108.

A roller 118 is pivotally coupled to the garbage can 12 such that the roller 118 can roll along the support surface 54. The roller 118 is positioned in the recess 46 in the bottom wall 16 of the garbage can 12. Furthermore, the roller 118 is pivotable about an axis extending between the bottom wall 16 of the garbage can 12 and the distal edge 20 of the outer wall 18 of the garbage can 12. In this way the roller 118 facilitates the garbage can 12 to be steered on the support surface 54. The roller 118 may include a pivot 120 which rotatably engages the garbage can 12, an axle 122 that is oriented transverse with the pivot 120 and a pair of wheels 124 that are disposed on opposing ends of the axle 122 with respect to each other.

In use, the air valves 78 facilitate air to pass out of the garbage can 12 when a garbage bag is inserted into the garbage can 12 and the air valves 78 facilitate air to pass into the garbage can 12 when a garbage bag is removed from the garbage can 12. The securing member 80 is secured to the engagement 86 to inhibit animals from opening the lid 14 and accessing garbage contained in the garbage can 12. Either the rear handle 90 or the front handle 108 is gripped to roll the garbage can 12 along the support surface 54. Additionally, the roller 118 facilitates the garbage can 12 to be rolled without having to tip the garbage can 12 onto the rear wheels 52 as is common with existing garbage cans. In this way a physically limited user can more easily transport the garbage can 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garbage receptacle assembly for inhibiting animals from accessing garbage being stored for collection, said assembly comprising:

a garbage can having a lid being hingedly disposed on said garbage can for opening and closing said garbage can;

a pair of rear wheels, each of said rear wheels being rotatably integrated into said garbage can wherein each of said rear wheels is configured to roll along a support surface for transporting said garbage can;

a wheel lock being movably integrated into said garbage can, said wheel lock being urgeable into a locking position thereby inhibiting each of said rear wheels from rotating, said wheel lock being biased into an unlocked position thereby facilitating said rear wheels to rotate;

a securing member being coupled to said lid, said securing member being comprised of a resiliently stretchable material thereby facilitating said securing member to be stretched;

an engagement being coupled to said garbage can, said securing member releasably engaging said engagement for locking said lid in a closed position wherein said securing member is configured to inhibit animals from opening said lid and accessing garbage contained in said garbage can;

a rear handle being coupled to and angling upwardly from said garbage can wherein said rear handle is configured to be gripped for transporting said garbage can, said rear handle having an adjustable length;

a front handle being coupled to said garbage can wherein said front handle is configured to be gripped; and a roller being pivotally coupled to said garbage can wherein said roller is configured to steer said garbage can along the support surface.

2. The assembly according to claim 1, wherein:

said garbage can has a bottom wall and an outer wall extending upwardly from said bottom wall, said outer wall having a distal edge with respect to said bottom wall defining an opening in said garbage can, said outer wall having a front side, a back side, a first lateral side and a second lateral side; and said lid has a top surface, a rear edge and a front edge, said rear edge being hingedly coupled to said distal edge of said outer wall such that said lid rests on said distal edge when said lid is closed, said top surface having a prominence extending upwardly from said top surface, said prominence having a central portion extending between a pair of outward portions, said outward portions being spaced apart from each other and being perpendicularly oriented with said central portion such that said prominence has a U-shape wherein said prominence is configured to inhibit objects place on said lid from sliding off of said lid, said central portion being oriented parallel to said rear edge of said lid having each of said outward portions extending toward said front edge of said lid.

3. The assembly according to claim 2, wherein:

said outer wall having a pair of wheel wells each being recessed into said outer wall, each of said wheel wells being positioned on a respective one of said first lateral side and said second lateral side, each of said wheel wells being aligned with an intersection with said back side of said outer wall;

said bottom wall has a recess extending upwardly toward said distal edge of said outer wall, said recess being aligned with said front side of said outer wall, said recess being centrally positioned along said front side; and said back side of said outer wall has a foot pedal well extending toward said front side of said outer wall, said food pedal wall being positioned adjacent to said bottom wall, said foot pedal well being centrally positioned on said back side.

4. The assembly according to claim 3, wherein:

said assembly includes an axle extending between each of said rear wheels;

said assembly includes a pair of bearings, each of said bearings being disposed on said axle, each of said bearings engaging a respective one of said rear wheels for enhancing rotation of said rear wheels on said axle wherein each of said bearings is configured to ease rolling said garbage can along the support surface; and said wheel lock comprises:

a gear being fixed around said axle such that said gear rotates when said axle rotates, said gear having an outer surface, said gear having a plurality of teeth being integrated into said outer surface; and a foot pedal having a first end and a second end, said foot pedal extending into said foot pedal well having said first end being positioned adjacent to said gear, said first end being pivotally coupled to said garbage can, said second end being positioned outside of said foot pedal wall wherein said second end is configured to be stepped upon, said foot pedal having a bend positioned between said first end and said second end, said foot pedal having a tooth extending downwardly from said foot pedal, said tooth being positioned adjacent to said first end, said tooth engaging respective ones of said teeth on said outer surface of said gear when said foot pedal is stepped upon thereby inhibiting said rear wheels from rotating, said foot pedal being biased into a releasing positioned having said tooth being displaced from said outer surface of said gear thereby facilitating said rear wheels to freely rotate.

5. The assembly according to claim 3, wherein said roller is positioned in said recess in said bottom wall of said garbage can, said roller being pivotable about an axis extending between said bottom wall of said garbage can and said distal edge of said outer wall of said garbage can wherein said roller is configured to facilitate said garbage can to be steered on the support surface.

6. The assembly according to claim 2, wherein said lid includes a hinge being coupled between said outer wall and said lid, said hinge rotating in a first direction when said lid is opened, said hinge rotating in a second direction when said lid is closed, said hinge resisting rotating in said second direction thereby inhibiting said lid from slamming into said closed position.

7. The assembly according to claim 2, further comprising a pair of air valves, each of said air valves being integrated into said garbage can, each of said air valves passing air either into or out of said garbage can when a garage bag is inserted into said garbage can or removed from said garbage can wherein said air valves are configured to inhibit negative air pressure or positive air pressure from building in said garbage can when the garbage bag is inserted into or removed from said garbage can, each of said air valves extending through a respective one of said first lateral side or said second lateral side of said outer wall of said garbage can, each of said air valves being positioned adjacent to said bottom wall of said garbage can.

8. The assembly according to claim 2, wherein:

said securing member is coupled to and extends downwardly from said front edge of said lid, said securing member having a distal end with respect to said front edge, said securing member having a ball being attached to said distal end; and said engagement is positioned on said front side of said outer wall of said garbage can, said engagement including a pair of fingers each extending away from said front wall, said fingers being spaced apart from each other thereby facilitating said securing member to be extended between said fingers, each of said fingers curving downwardly on toward said bottom wall of said garbage can thereby facilitating said fingers to conform to the curvature of said ball on said securing member when said securing member is extended between said fingers for locking said lid in said closed position.

9. The assembly according to claim 2, wherein said rear handle comprises:

a sleeve being integrated into said back side of said outer wall of said garbage can, said sleeve extending upwardly toward said distal edge of said outer wall and angling away from said back side, said sleeve having a distal end with respect to said back side and an outside wall, said outside wall having a plurality of lock holes each extending into an interior of said sleeve, said lock holes being spaced apart from each other and being distributed along a full length of said sleeve; and a member extending into said distal end of said sleeve such that said member is slidably disposed in said sleeve, said member having an exposed end with respect to said sleeve, said member curving rearwardly from said back side of said outer wall of said garbage can.

10. The assembly according to claim 9, wherein said rear handle comprises:

a rod being coupled to said exposed end having said rod being perpendicularly oriented with said member wherein said rod is configured to be gripped; and a lock being movably integrated into said member, said lock being biased outwardly form said member, said lock being urgeable into said member, said lock extending outwardly through a respective one of said lock holes in said sleeve for retaining said member at a selected length with respect to said sleeve.

11. The assembly according to claim 2, wherein said front handle has a middle portion extending between a pair out lateral portions, each of said lateral portions being spaced apart from each other and being perpendicularly oriented with said middle portion such that said front handle has a U-shape, each of said lateral portions having a distal end with respect to said middle portion, said distal end of each of said lateral portions being coupled to said front side of said outer wall of said garbage can.

12. A garbage receptacle assembly for inhibiting animals from accessing garbage being stored for collection, said assembly comprising:

a garbage can having a lid being hingedly disposed on said garbage can for opening and closing said garbage can, said garbage can having a bottom wall and an outer wall extending upwardly from said bottom wall, said outer wall having a distal edge with respect to said bottom wall defining an opening in said garbage can, said outer wall having a front side, a back side, a first lateral side and a second lateral side, said lid having a top surface, a rear edge and a front edge, said rear edge being hingedly coupled to said distal edge of said outer wall such that said lid rests on said distal edge when said lid is closed, said top surface having a prominence extending upwardly from said top surface, said prominence having a central portion extending between a pair of outward portions, said outward portions being spaced apart from each other and being perpendicularly oriented with said central portion such that said prominence has a U-shape wherein said prominence is configured to inhibit objects place on said lid from sliding off of said lid, said central portion being oriented parallel to said rear edge of said lid having each of said outward portions extending toward said front edge of said lid, said outer wall having a pair of wheel wells each being recessed into said outer wall, each of said wheel wells being positioned on a respective one of said first lateral side and said second lateral side, each of said wheel wells being aligned with an intersection with said back side of said outer wall, said bottom wall having a recess extending upwardly toward said distal edge of said outer wall, said recess being aligned with said front side of said outer wall, said recess being centrally positioned along said front side, said back side of said outer wall having a foot pedal well extending toward said front side of said outer wall, said food pedal wall being positioned adjacent to said bottom wall, said foot pedal well being centrally positioned on said back side, said lid including a hinge being coupled between said outer wall and said lid, said hinge rotating in a first direction when said lid is opened, said hinge rotating in a second direction when said lid is closed, said hinge resisting rotating in said second direction thereby inhibiting said lid from slamming into said closed position;

a pair of rear wheels, each of said rear wheels being rotatably integrated into said garbage can wherein each of said rear wheels is configured to roll along a support surface for transporting said garbage can, each of said rear wheels being positioned in a respective one of said wheel wells in said outer wall of said garbage can;

an axle extending between each of said rear wheels;

a pair of bearings, each of said bearings being disposed on said axle, each of said bearings engaging a respective one of said rear wheels for enhancing rotation of said rear wheels on said axle wherein each of said bearings is configured to ease rolling said garbage can along the support surface;

a wheel lock being movably integrated into said garbage can, said wheel lock being urgeable into a locking position thereby inhibiting each of said rear wheels from rotating, said wheel lock being biased into an unlocked position thereby facilitating said rear wheels to rotate, said wheel lock comprising:

a gear being fixed around said axle such that said gear rotates when said axle rotates, said gear having an outer surface, said gear having a plurality of teeth being integrated into said outer surface; and a foot pedal having a first end and a second end, said foot pedal extending into said foot pedal well having said first end being positioned adjacent to said gear, said first end being pivotally coupled to said garbage can, said second end being positioned outside of said foot pedal wall wherein said second end is configured to be stepped upon, said foot pedal having a bend positioned between said first end and said second end, said foot pedal having a tooth extending downwardly from said foot pedal, said tooth being positioned adjacent to said first end, said tooth engaging respective ones of said teeth on said outer surface of said gear when said foot pedal is stepped upon thereby inhibiting said rear wheels from rotating, said foot pedal being biased into a releasing positioned having said tooth being displaced from said outer surface of said gear thereby facilitating said rear wheels to freely rotate;

a pair of air valves, each of said air valves being integrated into said garbage can, each of said air valves passing air either into or out of said garbage can when a garage bag is inserted into said garbage can or removed from said garbage can wherein said air valves are configured to inhibit negative air pressure or positive air pressure from building in said garbage can when the garbage bag is inserted into or removed from said garbage can, each of said air valves extending through a respective one of said first lateral side or said second lateral side of said outer wall of said garbage can, each of said air valves being positioned adjacent to said bottom wall of said garbage can;

a securing member being coupled to said lid, said securing member being comprised of a resiliently stretchable material thereby facilitating said securing member to be stretched, said securing member being coupled to and extending downwardly from said front edge of said lid, said securing member having a distal end with respect to said front edge, said securing member having a ball being attached to said distal end;

an engagement being coupled to said garbage can, said securing member releasably engaging said engagement for locking said lid in a closed position wherein said securing member is configured to inhibit animals from opening said lid and accessing garbage contained in said garbage can, said engagement being positioned on said front side of said outer wall of said garbage can, said engagement including a pair of fingers each extending away from said front wall, said fingers being spaced apart from each other thereby facilitating said securing member to be extended between said fingers, each of said fingers curving downwardly on toward said bottom wall of said garbage can thereby facilitating said fingers to conform to the curvature of said ball on said securing member when said securing member is extended between said fingers for locking said lid in said closed position;

a rear handle being coupled to and angling upwardly from said garbage can wherein said rear handle is configured to be gripped for transporting said garbage can, said rear handle having an adjustable length, said rear handle comprising:

a sleeve being integrated into said back side of said outer wall of said garbage can, said sleeve extending upwardly toward said distal edge of said outer wall and angling away from said back side, said sleeve having a distal end with respect to said back side and an outside wall, said outside wall having a plurality of lock holes each extending into an interior of said sleeve, said lock holes being spaced apart from each other and being distributed along a full length of said sleeve;

a member extending into said distal end of said sleeve such that said member is slidably disposed in said sleeve, said member having an exposed end with respect to said sleeve, said member curving rearwardly from said back side of said outer wall of said garbage can;

a rod being coupled to said exposed end having said rod being perpendicularly oriented with said member wherein said rod is configured to be gripped; and a lock being movably integrated into said member, said lock being biased outwardly form said member, said lock being urgeable into said member, said lock extending outwardly through a respective one of said lock holes in said sleeve for retaining said member at a selected length with respect to said sleeve;

a front handle being coupled to said garbage can wherein said front handle is configured to be gripped, said front handle having a middle portion extending between a pair out lateral portions, each of said lateral portions being spaced apart from each other and being perpendicularly oriented with said middle portion such that said front handle has a U-shape, each of said lateral portions having a distal end with respect to said middle portion, said distal end of each of said lateral portions being coupled to said front side of said outer wall of said garbage can; and a roller being pivotally coupled to said garbage can wherein said roller is configured to steer said garbage can along the support surface, said roller being positioned in said recess in said bottom wall of said garbage can, said roller being pivotable about an axis extending between said bottom wall of said garbage can and said distal edge of said outer wall of said garbage can wherein said roller is configured to facilitate said garbage can to be steered on the support surface.

* * * * *